United States Patent [19]
Ido

[11] Patent Number: 5,546,118
[45] Date of Patent: Aug. 13, 1996

[54] DATA RECORDING/REPRODUCING METHOD AND DATA SEND-OUT METHOD

[75] Inventor: Yasuo Ido, Kanagawa, Japan

[73] Assignee: Sony Corporation, Tokyo, Japan

[21] Appl. No.: 492,284

[22] Filed: Jun. 19, 1995

[30] Foreign Application Priority Data

Jun. 20, 1994 [JP] Japan .................................. 6-137018

[51] Int. Cl.$^6$ ...................................... N04N 5/92
[52] U.S. Cl. .................. 348/7; 360/32; 358/335; 358/310; 348/714
[58] Field of Search ................. 348/7, 714, 716, 348/715; 358/335, 310; 360/32; H04N 5/92

[56] References Cited

U.S. PATENT DOCUMENTS 5,130,861  7/1992  Suma ........................ 358/310
5,473,362  12/1995  Fitzgerald et al. .................. 348/7

*Primary Examiner*—Victor R. Kostak
*Assistant Examiner*—Martha J. Hopkins
*Attorney, Agent, or Firm*—William S. Frommer; Alvin Sinderbrand

[57] ABSTRACT

A data recording/reproducing method for a so-called near video-on-demand for time-differentially distributing motion picture films or the like. When recording continuous data of, for example, a cinema program, the data is split into, for example, 12 channels CHA to CHL. The channel data is further split into 2400 portions, while the data of the 2400 portions associated with the respective channels are re-arrayed to form blocks $BL_0$ to $BL_{2399}$ for each channel. The block data is recorded on a recording medium so that the blocks will be arrayed in the sequence of blocks $BL_0$, $BL_{2339}$, $BL_1$, $BL_{2338}$, ... $BL_{1200}$. For data readout from the recording medium, every second blocks are read out, beginning from the block $BL_0$. After reproducing the block $BL_{1119}$, every second blocks are read out in the reverse direction beginning from the block $BL_{1000}$ for data reproduction.

3 Claims, 7 Drawing Sheets

DATA RECORDING/REPRODUCING METHOD AND DATA SEND-OUT METHOD

BACKGROUND OF THE INVENTION

This invention relates to a data recording/reproducing method and a data send-out method. More particularly, it relates to a data recording/reproducing method in a so-called near video-on-demand for time-differentially distributing e.g. cinema films.

In the near video-on-demand in which continuous data is simultaneously outputted over plural channels, for example, compressed data obtained on encoding picture signals of a cinema in accordance with a pre-set encoding system is distributed time-differentially, data for a cinema are written in a so-called mass storage whose access time is significantly higher than the data transfer rate, such as a magnetic disc device, referred to hereinafter as a hard disc device, or a magneto-optical disc, and are read out from plural optional places of the recording medium, so that continuous multi-channel data having different distribution time points can be outputted simultaneously, that is in parallel.

Meanwhile, if cinema data is sequentially recorded, beginning from the leading frame of the cinema, in a direction from the outer rim towards the inner rim of the magnetic disc provided in the hard disc device, the magnetic disc has to seek a long distance since reading the last frame until reading the leading frame, thus significantly protracting the access time. Consequently, for outputting data continuously, that is without interruption, it is necessary to employ a large capacity buffer memory in order to take the maximum access time into account.

In other words, if, when reading out data from a mass storage in the near video-on-demand for outputting continuous data over plural channels in parallel, the number of channels is to be increased, it is necessary to provide a mass storage of a higher speed and a buffer memory of a larger capacity in order to take the maximum access time into account.

OBJECT AND SUMMARY OF THE INVENTION

It is therefore an object of the present invention to provide a data recording method and apparatus and a data send-out method whereby the maximum access time may be shorter than heretofore and the buffer memory for enabling continuous data to be outputted may be of a small size.

In one aspect, the present invention provides a method for recording/reproducing data in which continuous data is split into $\underline{N}$ portions to form large-block data $D_i$, where i=0 to N−1, the large-block data $D_i$ is further split into M portions to form small-block data $d_{ij}$ consisting of $d_{00}, d_{01} \ldots d_{0M-1}, d_{10}, d_{11}, \ldots d_{N-1M-1}$, where i=0 to N−1 and j=0 to M−1. The corresponding small-block data $d_{ij}$ of the large-block data are re-arrayed in a unifying manner to form a re-arranged block $BL_0$ made up of small-block data $d_{i0}$ (i=0 to N−1), a re-arranged block $BL_1$ made up of small-block data $d_{i1}$ (i=0 to N−1), . . . and a re-arranged block $BL_{M-1}$ made up of small-block data $d_{iM-1}$ (i=0 to N−1). The re-arranged blocks $BL_j$ (j=0 to M−1) are recorded on the recording medium so that the re-arranged blocks will be arrayed in the sequence of $BL_0, BL_{M-1}, BL_1, BL_{M-2}, BL_2, BL_{M-3}, \ldots$ thereon. Every two modified blocks $BL_j$ (j=0 to M−1) are reproduced from the recording medium in the forward direction and, after reproducing the re-arrayed block $BL_{M/2}$, every two re-arrayed blocks $BL_j$ (j=0 to M−1) are reproduced in the reverse direction.

In another aspect, the present invention provides a method for recording/reproducing data in which continuous data is split into $\underline{N}$ portions to form large-block data $D_i$, where i=0 to N−1. The large-block data $D_i$ is further split into M portions to form small-block data $d_{ij}$ consisting of $d_{00}, d_{0i} \ldots d_{0M-1}, d_{10}, d_{11}, \ldots d_{N-1M-1}$, where i=0 to N−1 and j=0 to M−1. The corresponding small-block data $d_{ij}$ of the large-block data is re-arrayed in a unifying manner to form a modified block $BL_0$ made up of small-block data $d_{i0}$ (i=0 to N−1), a modified block $BL_1$ made up of small-block data $d_{i1}$ (i=0 to N−1), . . . and a re-arrayed block $BL_{M-1}$ made up of small-block data $d_{iM-1}$ (i=0 to N−1). The re-arrayed blocks $BL_j$ (j=0 to M−1) are recorded on the recording medium so that the re-arrayed blocks will be arrayed in the sequence of $BL_0, BL_{M-1}, BL_1, BL_{M-2}, BL_2, BL_{M-3}, \ldots$ Every two modified blocks $BL_j$ (j=0 to M−1) are reproduced from the recording medium in the forward direction. After reproducing the modified block $BL_{M/2}$, every two re-arranged blocks $BL_j$ (j=0 to M−1) are reproduced in the reverse direction, and the reproduced re-arranged blocks $BL_j$ (j=0 to M−1) are written in $\underline{N}$ of the memories so that data $d_{ij}$ (i=0 to N−1, j=0 to M−1) of the small-blocks constituting the large-block data $D_i$ (i=0 to N−1) will be stored in the same memory. The small-block data $d_{ij}$ (i=0 to N−1, j=0 to M−1) are read and sent out from the $\underline{N}$ memories.

According to the present invention, when recording continuous data, such as a program, on a recording medium, continuous data is split into $\underline{N}$ portions to form large-block data $D_i$, where i=0 to N−1, and the large-block data $D_i$ is further split into M portions to form small-block data $d_{ij}$ consisting of $d_{00}, d_{01} \ldots d_{0M-1}, d_{10}, d_{11}, \ldots d_{N-1M-1}$, where i=0 to N−1 and j=0 to M−1. The corresponding small-block data $d_{ij}$ of the large-block data are re-arrayed in a unifying manner to form a re-arrayed block $BL_0$ made up of small-block data $d_{i0}$ (i=0 to N−1), a re-arrayed block $BL_1$ made up of small-block data $d_{i1}$ (i=0 to N−1), . . . and a re-arrayed block $BL_{M-1}$ made up of small-block data $d_{iM-1}$ (i=0 to N−1). The re-arrayed blocks $BL_j$ (j=0 to M−1) are recorded on the recording medium so that the re-arrayed blocks will be arrayed in the sequence of $BL_0, BL_{M-1}, BL_1, BL_{M-2}, BL_2, BL_{M-3}, \ldots$ thereon. Every two re-arrayed blocks $BL_j$ (j=0 to M−1) are reproduced from the recording medium in the forward direction and, after reproducing the re-arrayed block $BL_{M/2}$, every two re-arrayed blocks $BL_j$ (j=0 to M−1) are reproduced in the reverse direction. Every second re-arrayed blocks $BL_i$ are reproduced from the recording medium in the forward direction and, after reproducing the re-arrayed block $BL_{M/2}$, every second re-arrayed blocks $BL_i$ are reproduced in the reverse direction. Thus the maximum access time for reading out data from the recording medium may be shorter significantly than heretofore, while the buffer memory for continuously outputting reproduced data may also be of small capacity.

DESCRIPTION OF PREFERRED EMBODIMENTS

Figure 1:
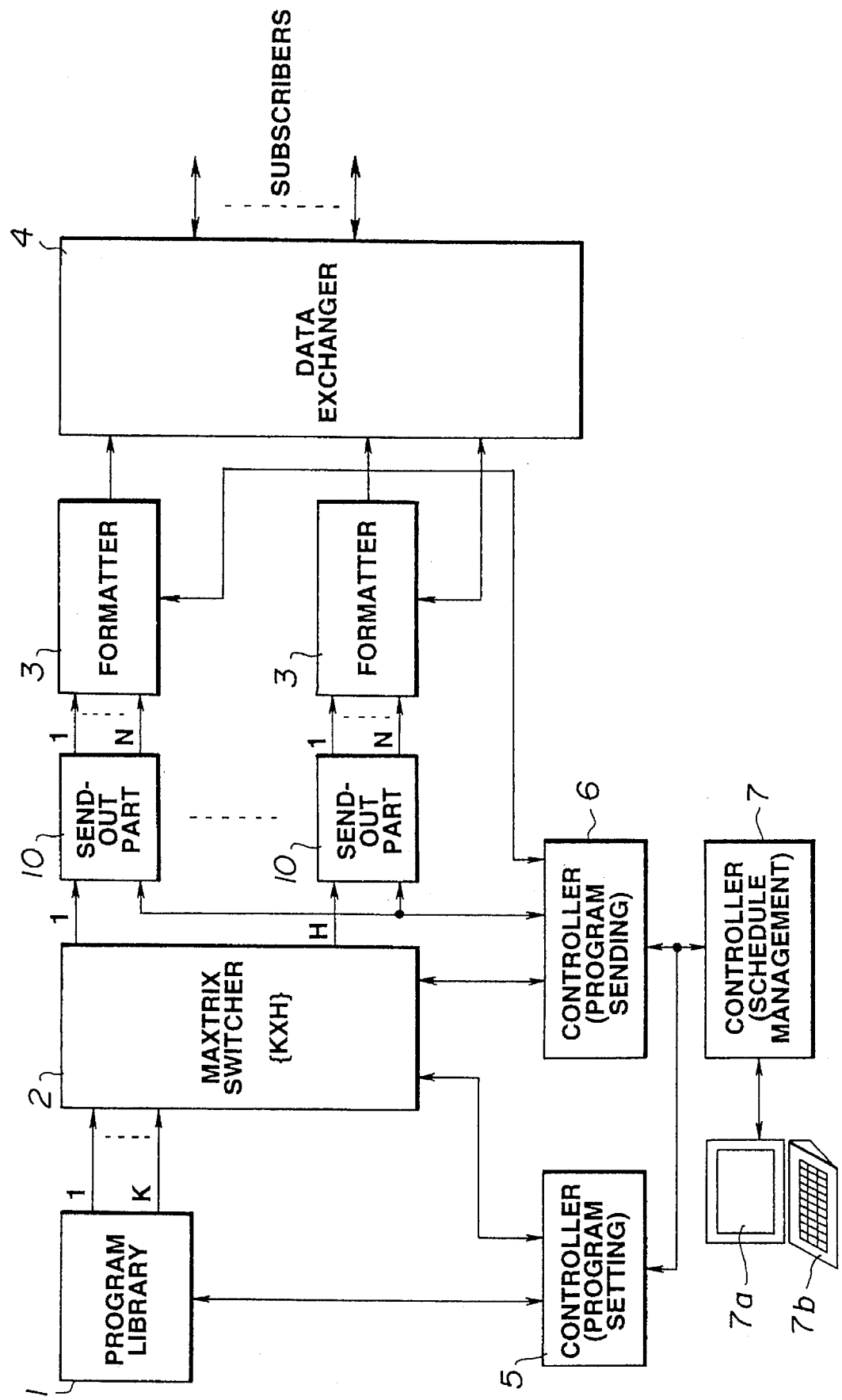
FIG. 1 is a block diagram showing an illustrative construction of a data send-out system according to the present invention.

Referring to the drawings, a preferred embodiment of the data recording method and the data send-out method according to the present invention will be explained in detail. The present embodiment is directed to a data send-out system in the so-called near video-on-demand, or a so-called video server, and FIG. 1 is a block diagram showing the data send-out system.

Referring to FIG. 1, a data send-out system according to the present invention includes a program library 1 having data of plural stored programs and configured to output data simultaneously from $\underline{K}$ input channels, and a matrix switcher 2 having $\underline{K}$ input channels and $\underline{H}$ output channels and configured to change over destinations of data sent out from the program library 1. The data send-out system also has $\underline{H}$ send-out parts 10 for recording data from the matrix switcher 2 on a recording medium and for simultaneously outputting the recorded data over $\underline{N}$ channels, and $\underline{H}$ formatters 3 for sending out data of the $\underline{N}$ channels from the send-out parts 10 in accordance with the pre-set format. The data send-out system also includes a data exchanger 4 for exchanging data from the $\underline{H}$ formatters 3 for distributing the data among subscribers, a controller 5 for controlling the matrix switcher 2 and a controller 6 for controlling the formatter 3. The data send-out system finally includes a controller 7 for controlling the controllers 5 and 6.

The present data send-out system is configured to time-differentially distribute compressed data, obtained on encoding picture signals of a program, such as a cinema, in accordance with a pre-set encoding system, over $\underline{N}$ channels.

Specifically, data of all programs that may be offered to the subscribers are stored in the program library 1, from which $\underline{K}$ programs can be outputted simultaneously. The controller 7 is responsive to program requests sent from the subscribers via the data exchanger 4 to effect schedule management of programs to be distributed in order to control the controllers 5 and 6 based upon this schedule. The controller 5 is responsive to commands from the controller 7 to control the program library 1 and the matrix switcher 2 so that the program library 1 and the matrix switcher 2 furnishes data of the programs requested by the subscriber to the specified send-out part 10.

Each send-out part 10 includes a so-called mass storage as later explained and operates under control by the controller 6 to record data supplied via the matrix switcher 2 on the recording medium in accordance with a recording format as later explained, reproduce data from the recording medium and to furnish $\underline{N}$ channel program data having differential distribution time points to the formatter 3. That is, the send-out part 10 sends out data of, for example, a cinema, with a pre-set time difference over $\underline{N}$ channels simultaneously.

The formatter 3 operates under control by the controller 6 to append ID of subscriber identification to data supplied from the send-out unit 10 and to transform the data into a format specified by the data exchanger 4.

The data exchanger 4 exchanges data supplied from the formatter 3 in order to send out data of the program desired by plural subscribers continuously, that is without interruptions. Thus the subscribers are able to view the desired program after waiting only for a time length corresponding at most to the above-mentioned pre-set time difference since the time of placing requests.

An illustrative construction of the send-out part 10 is now explained.

Figure 2:
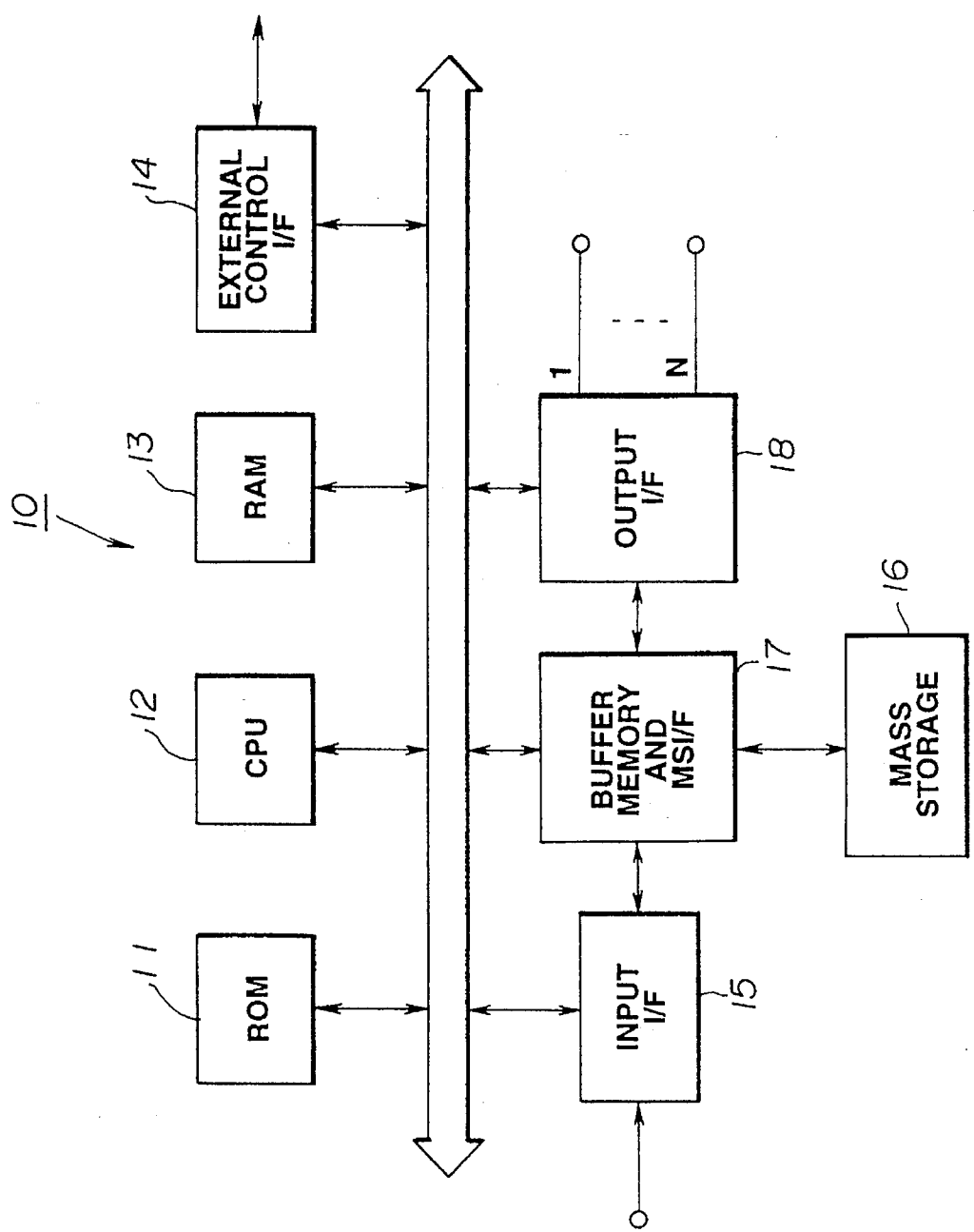
FIG. 2 is a block diagram showing an illustrative construction of a send-out unit constituting the data send-out system.

Referring to FIG. 2, the send-out part 10 has a read-only memory (ROM) 11 having a stored program therein for controlling various components, and a central processing unit (CPU) 12 for executing the program stored in the ROM 11. The send-out part 10 also includes a random access memory (RAM) 13 for temporarily storing results of execution or the like, and an external control interface (I/F) 14 responsible for interfacing with the controller 6 or the like. The send-out part 10 also includes an input interface (I/F) 15 for receiving data from the matrix switcher 2, and a mass storage 16 for storing data received by the input interface 15. The send-out part finally includes a mass storage interface (MSI/F) 17 for controlling the mass storage 16 and an output interface 18 for outputting data read out from the mass storage 16 over $\underline{N}$ channels simultaneously.

The CPU 12 controls various components under commands supplied from the controller 6 via the output control interface 14 in order to execute the program stored in the ROM 11 for storing data received by the input interface 15 in accordance with a pre-set recording medium provided in the mass storage 16 and for reading out data from the recording medium for simultaneously outputting $\underline{N}$ channel data.

That is, program data received via the input interface 15 from the matrix switcher 2 are temporarily stored in a buffer memory provided in the mass storage interface 17 as later explained, and are subsequently converted into data of a pre-set format which is stored in the mass storage 16.

Figures 3A, 3B:
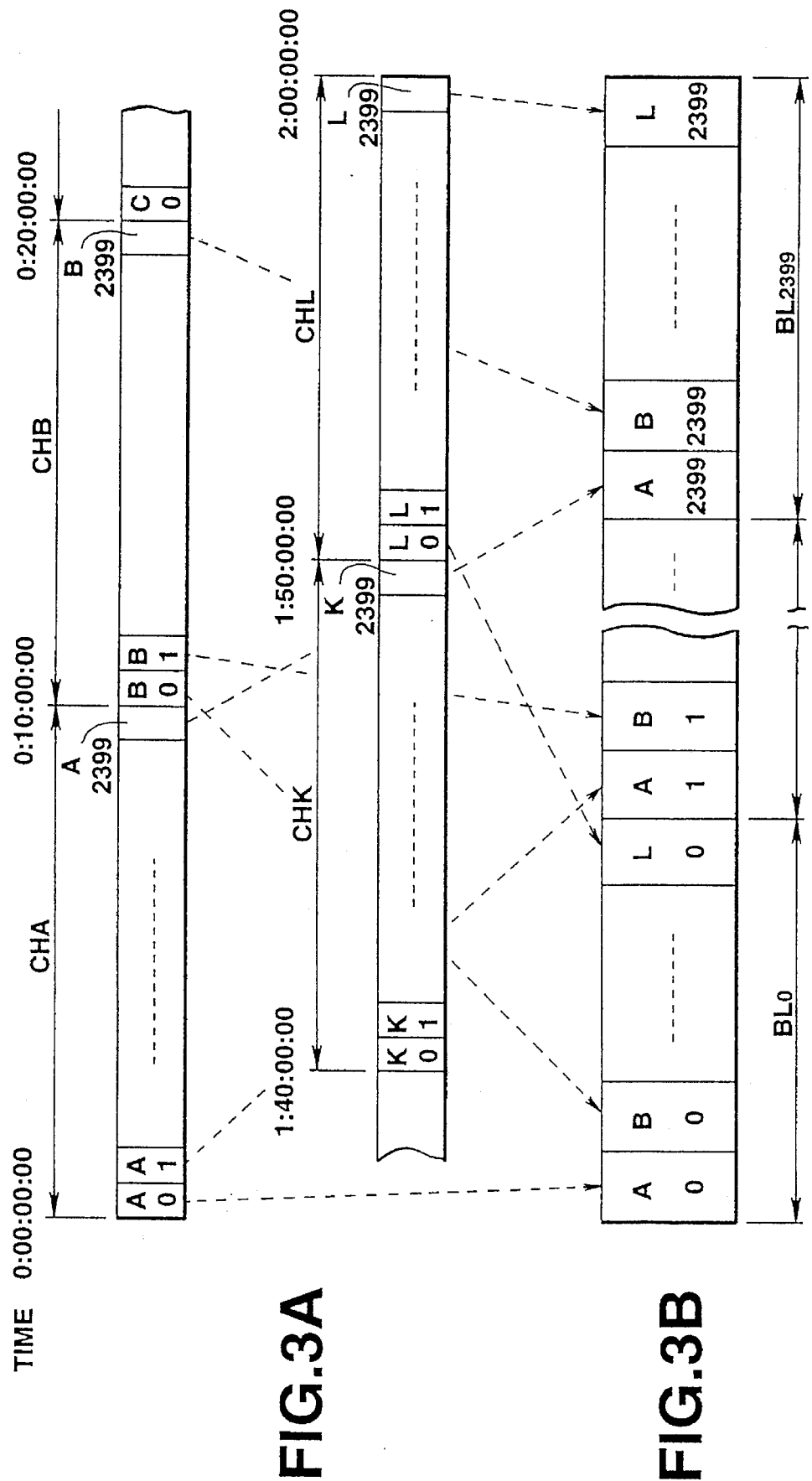
FIG. 3A and FIG. 3B show an illustrative data format of the block.

Specifically, assuming that data of a cinema continuing for two hours is distributed, the total data quantity of the cinema is 23040 (=3.2M×60×2) Mbits for the bit rate of 3.2 Mbits/sec. The 2-hour data is divided by $\underline{N}$ channels, for example, 12 channels $Ch_i$, where i=0 to 11, referred to hereinafter as channels CHA to CHL, each continuing for ten minutes, as shown FIG. 3A. The data of the respective channels $CH_i$ are further divided into $\underline{M}$ data portions, for example, 2400 portions, to form small-block data $d_{ij}$, where i=0 to 11 and j=0 to 2399. These data portions are referred to hereinafter as data A0, A1, . . . , L2399. The divided data portions associated with the channels $CH_i$ are then unified, that is data of the channels CHA to CHL having the same numbers are re-arrayed in the order of sequentially increasing numbers, to form 2400 blocks $BL_j$, where j=0 to 2399, as shown in FIG. 3B.

The mass storage 16 is comprised of magneto-optical disc devices, each having a magneto-optical disc, having the data read/write rate of 40 Mbits/sec. The magneto-optical disc has tracks Tr0, Tr1, Tr2, . . . from the outer periphery towards the inner periphery. If, for example, the above-mentioned one-block data can be stored in each track, the mass storage 16 records data of the blocks $BL_j$ in accordance with a pre-set recording format, that is in the sequence of the blocks $BL_0, BL_{M-1}, BL_1, BL_{M-2}, BL_2, BL_{M-3}, \ldots$, from the outer periphery towards the inner periphery of the magneto-optical disc.

Figure 4:
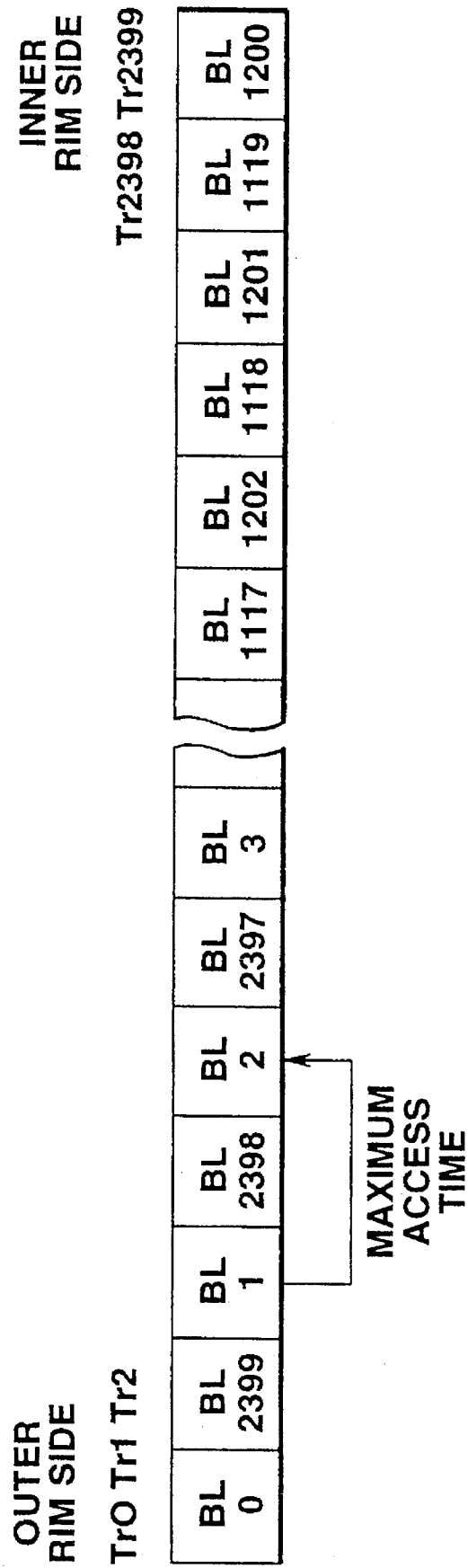
FIG. 4 shows an illustrative recording format for recording on a recording medium.

That is, as shown in FIG. 4, the mass storage 16 records data of every second blocks $BL_0$ to $BL_{1119}$, that is in the sequence of the tracks Trj, where j is an even number, from the outer periphery towards the inner periphery of the disc. At a time point when data of the block $BL_{1119}$ has been recorded on the track Tr2398, data of the block $BL_{1200}$ to $BL_{2399}$ are recorded in unrecorded tracks that is on tracks Trj, where j is an odd number, from the inner periphery towards the outer periphery of the magneto-optical disc. In this manner, the cinema data is written in the mass storage 16.

When reading out data from the mass storage 16, the mass storage 16 sequentially reproduces data of blocks $BL_0$ to $BL_{1119}$ of every two tracks, that is data of tracks Trj, where j is an even number, in a direction from the outer periphery towards the inner periphery of the magneto-optical disc. At a time point when the data of the block $BL_{1119}$ has been reproduced from the track Tr2399, data of the blocks $BL_{1200}$ to $BL_{2399}$ are sequentially reproduced from unreproduced tracks, that is tracks Trj, where j is an odd number, in a direction from the inner periphery towards the outer periphery of the magneto-optical disc. After the data is reproduced up to the data of the block $BL_{2399}$, data reproduction is restarted at the data of the block $BL_0$, and data reproduction of from the block $BL_0$ to the block $BL_{2399}$ is repeated a number of times. The data thus read out from the mass storage 16 is temporarily stored in a buffer memory provided in the mass storage interface 17 and subsequently supplied to the output interface 18.

Figure 5:
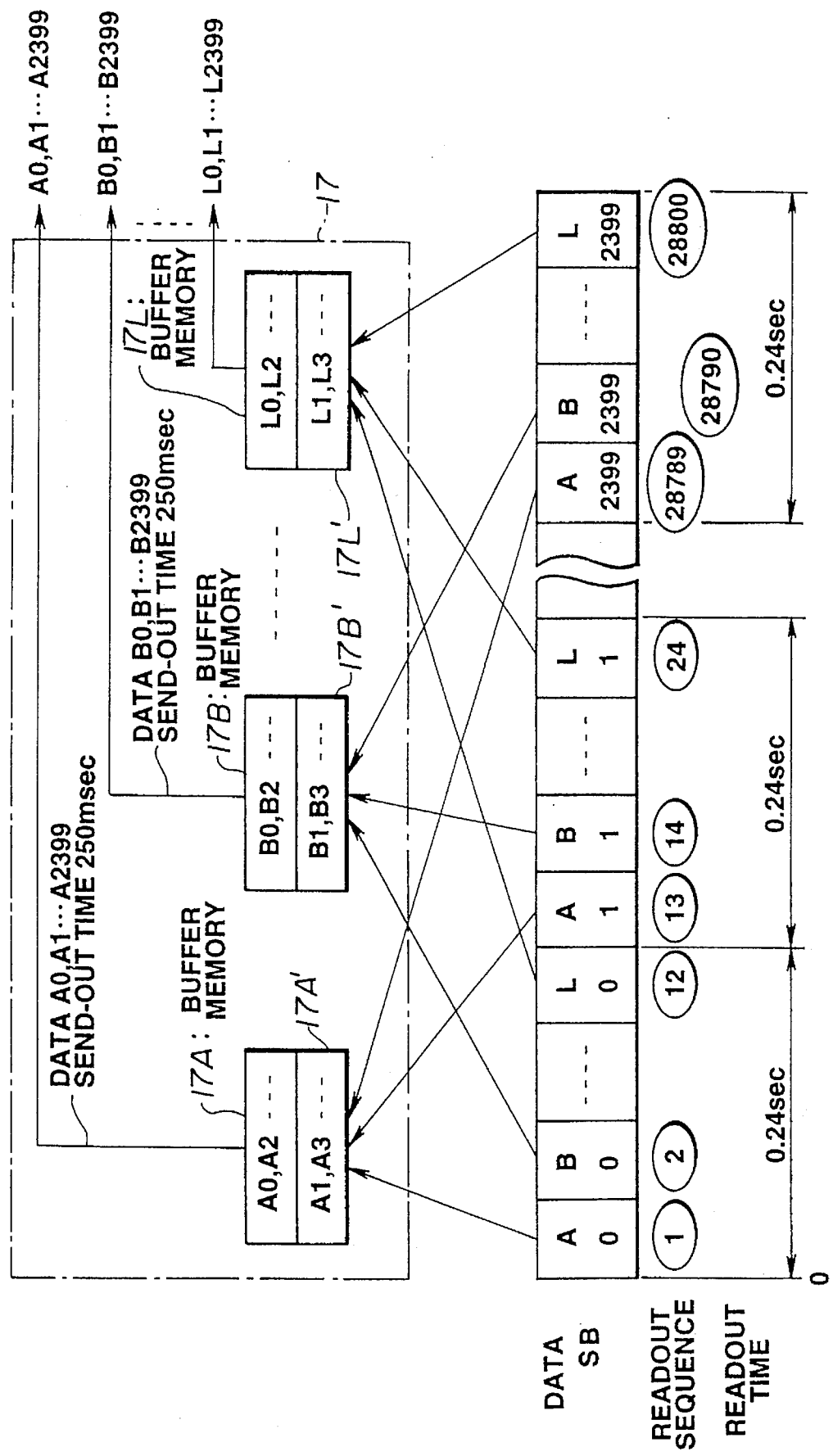
FIG. 5 shows an illustrative construction of a buffer memory in a mass storage interface constituting the data send-out system.

Specifically, the mass storage interface 17 has each two buffer memories 17A, 17A, 17B, 17B, . . . 17L, 17L, as shown in FIG. 5. The data read out from the mass storage 16 is sequentially stored in the buffer memories 17A to 17L and subsequently read out and transmitted to the output interface 18. The capacity of each of the buffer memories 17A to 17L associated with the channels CHA to CHL at a rate of two per channel, is e.g., 6.4 Mbits, which is 2 seconds in terms of send-out time. The data A0, initially read out from the mass storage 16, is stored in the buffer memory 17A of the channel CHA, while the next data B0 is stored in the buffer memory 17B of the channel CHB. In a similar manner, the data L0 is stored in the buffer memory 17L of the channel CHL. The 13th read-out data A1 is then stored in the other buffer memory 17A of the channel CHA. The read-out data A0 to L2399 are sequentially stored in this manner in the 24 buffer memories 17A to 17L. The data stored in the buffer memories 17A to 17L is read out in parallel from the buffer memories 17A to 17L in the sequence in which they were stored.

After the data A2399 to L2399 have been stored in the buffer memories 17A to 17L, the data A0 to L0 read out from the mass storage 16 are stored in the buffer memories in a sequence shifted by one buffer memory, that is in the sequence of 17L, 17A., . . . 17K.

Figure 6:
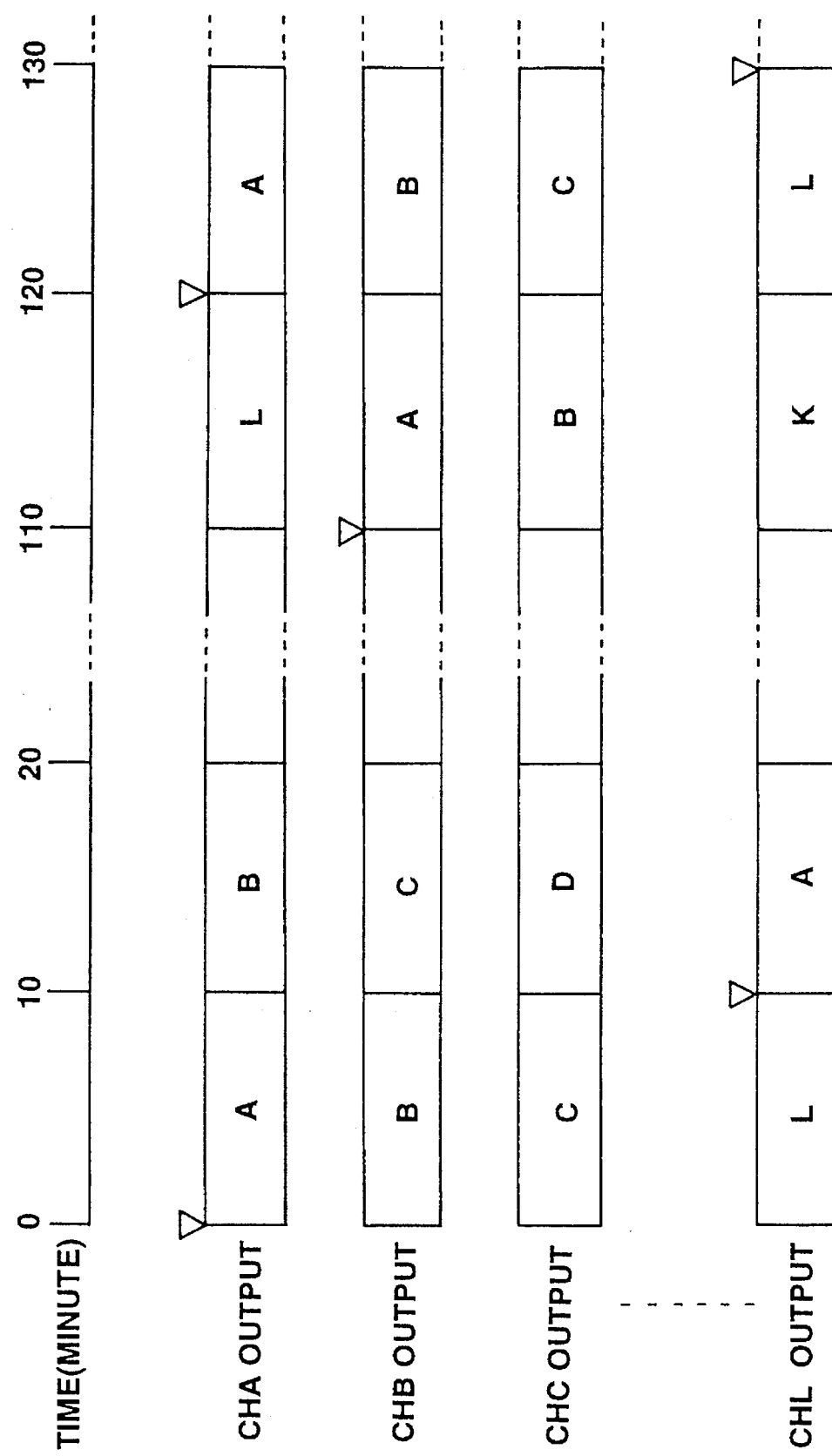
FIG. 6 is a timing chart for data outputted by the send-out unit.

Thus the data A (A0 to A2399), B (B0 to B2399), . . . L (L0 to L2399), are simultaneously sent out from the mass storage interface 17 for the channels $CH_0$ to $CH_{11}$ (channels CHA to CHL) with a one-channel shift, as shown in FIG. 6. In the present embodiment, the channel-to-channel shift is 10 minutes.

Thus, by storing data read out from the mass storage 16 in the buffer memories 17 with a shift of one buffer memory, all data on the mass storage 16 can be sent out for the respective channels $CH_0$ to $CH_{11}$, while data can be sent out simultaneously with a shift of a pre-set data quantity for each of the channels $CH_0$ to $CH_{11}$. If short programs of 10 minutes are each recorded in respective areas of the mass storage 16, twelve different programs can be simultaneously sent out over channels $CH_0$ to $CH_{11}$. On the other hand, if a cinema continuing 120 minutes is recorded, data from the leading end of the program is sent out from the channels $CH_0$ to $CH_{11}$ with a shift of 10 minutes from channel to channel. Thus the subscriber can view the program from the outset after waiting for ten minutes at the maximum. In this case, data of the channel having the start time closest to the request time by the subscriber is selected and sent out to the subscriber.

The data write speed to the buffer memory 17 and the data readout speed therefrom are now compared to each other.

Data stored in the mass storage 18 is read out at a rate of 40 Mbits per second as described above so as to be written in the buffer memory 17. That is, the time required in reading out data of the blocks $BL_0$ to $BL_{2399}$ from the mass storage 16 is each 0.24 second (=23040 Mbits/240/40 Mbps) per block. On the other hand, the time required for reading out the data A0 to L2399 from the buffer memories 17A to 17L is 0.25 second (=23040 Mbits/2400/12/3.2 Mbps). Thus there is a difference of 0.01 second between the time length of 0.24 second which elapses since the data A0 is read out from the mass storage 16 and starts to be stored in the buffer memory 17A and the time length of 0.25 second required for reading out the data A0 from the buffer memory 17A. Thus the access time of not longer than 0.01 second suffices for having access from the track TR0 to the track TR2 of the mass storage 16. In the present embodiment, the time for the head to seek two tracks is set to not longer than 0.01 second.

Figure 7:
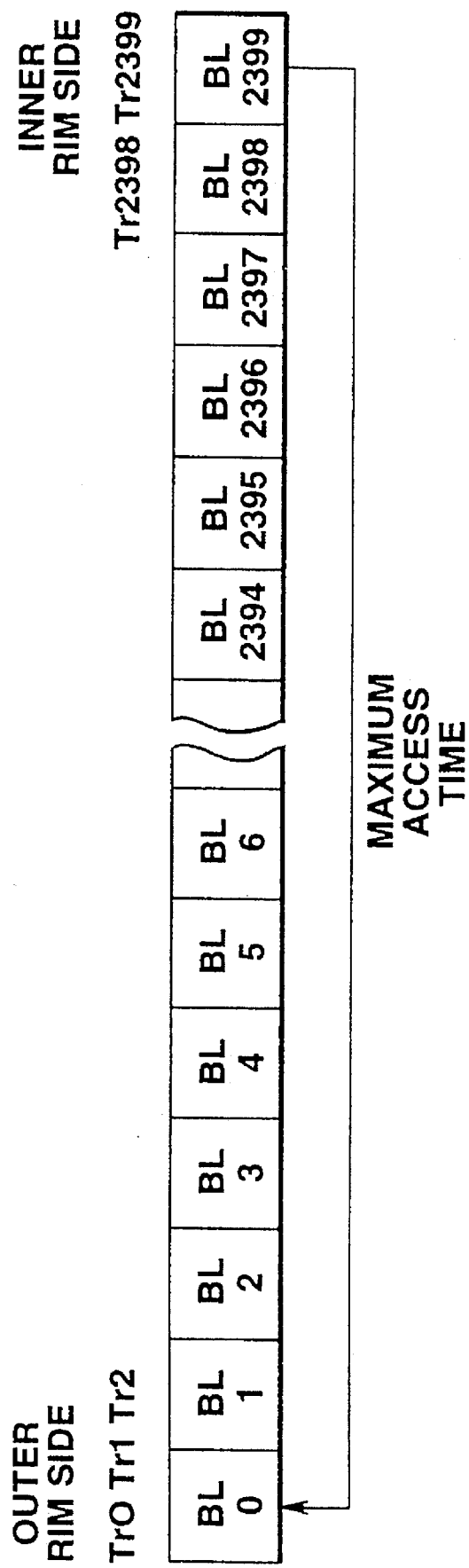
FIG. 7 illustrates a recording format for recording on a conventional recording medium.

It is now assumed that data of the blocks $BL_j$ is sequentially recorded beginning from the track TR0 of the mass storage 16, as shown in FIG. 7. In this case, after reproducing data of the track TR2399, the head must be moved for seeking up to the track TR0. Thus a redundant capacity corresponding to the seeking of 2400 tracks is required of the buffer memory 17. If the mass storage 16 is a magneto-optical disc, this seek time amounts approximately to 0.25 second. Consequently, a redundant capacity of approximately 0.8 Mbit is required of the buffer memory 17. That is, a redundant capacity of approximately 0.8 Mbit is required of the channel-based buffer memory 17 in addition to 0.8 Mbits which is the data quantity for one of data A0 to L2399, such as data A0, so that a sum of at least 1.6 Mbits is required.

On the other hand, since data is recorded from the outer periphery towards the inner periphery of the magneto-optical disc as the mass storage 16 in the sequence of the blocks $BL_0$, $BL_{M-1}$, $BL_1$, $BL_{M-2}$, $BL_2$, . . . , the maximum access time is approximately equal to the time for the head to seek two tracks, thus being extremely short. Consequently, the data quantity of the buffer memory associated with each channel of 0.8 Mbits, which is the data quantity for one of the data A0 to L2399, such as data A0, suffices, thus enabling the buffer memory capacity to be reduced significantly.

The present invention is not limited to the above-described embodiments. For example, the mass storage 16 may be a magnetic disc device, a magnetic tape device or the like, instead of being the magneto-optical disc, as described above. Specifically, with the magnetic tape device, program data is recorded thereon from the leading end of the tape in accordance with the pres-set recording format shown in FIG. 4. For example, program data may be pre-stored in the program library 1 in accordance with the pres-set recording format.

What is claimed is:

1. A method for recording/reproducing data comprising:

splitting continuous data into $\underline{N}$ portions to form large-block data $D_i$, where $i=0$ to $N-1$;

splitting the large-block data $D_i$ into M portions to form small-block data $d_{ij}$ consisting of $d_{00}$, $d_{01}$ ... $d_{0M-1}$, $d_{10}$, $d_{11}$, ... $d_{N-1M-1}$, where $i=0$ to $N-1$ and $j=0$ to $M-1$;

re-arraying corresponding small-block data $d_{ij}$ of the large-block data in a unifying manner to form re-arrayed blocks $BL_j$ ($j=0$ to $M-1$) consisting of a re-arrayed block $BL_0$ made up of small-block data $d_{i0}$ ($i=0$ to $N-1$), a re-arrayed block $BL_1$ made up of small-block data $d_{i1}$ ($i=0$ to $N-1$), ... and a re-arrayed block $BL_{M-1}$ made up of small-block data $d_{iM-1}$ ($i=0$ to $N-1$);

recording said re-arrayed blocks $BL_j$ ($j=0$ to $M-1$) on the recording medium so that the re-arrayed blocks will be arrayed in the sequence of $BL_0$, $BL_{M-1}$, $BL_1$, $BL_{M-2}$, $BL_2$, $BL_{M-3}$, ... thereon;

reproducing every two modified blocks $BL_j$ ($j=0$ to $M-1$) from said recording medium in the forward direction and, after reproducing said re-arrayed block $BL_{M/2}$, reproducing every two re-arrayed blocks $BL_j$ ($j=0$ to $M-1$) in the reverse direction.

2. A method for recording/reproducing data comprising:

splitting continuous data into $\underline{N}$ portions to form large-block data $D_i$, where $i=0$ to $N-1$;

splitting the large-block data $D_i$ into M portions to form small-block data $d_{ij}$ consisting of $d_{00}$, $d_{0i}$ ... $d_{0M-1}$, $d_{10}$, $d_{11}$, ... $d_{N-1M-1}$, where $i=0$ to $N-1$ and $j=0$ to $M-1$;

re-arraying corresponding small-block data $d_{ij}$ of the large-block data in a unifying manner to form re-arrayed blocks $BL_j$ ($j=0$ to $M-1$) consisting of a re-arrayed block $BL_0$ made up of small-block data $d_{i0}$ ($i=0$ to $N-1$), a re-arrayed block $BL_1$ made up of small-block data $d_{i1}$ ($i=0$ to $N-1$), ... and a re-arrayed block $BL_{M-1}$ made up of small-block data $d_{iM-1}$ ($i=0$ to $N-1$);

recording said re-arrayed blocks $BL_j$ ($j=0$ to $M-1$) on the recording medium so that the re-arrayed blocks will be arrayed in the sequence of $BL_0$, $BL_{M-1}$, $BL_1$, $BL_{M-2}$, $BL_2$, $BL_{M-3}$, ... ;

reproducing every two re-arrayed blocks $BL_j$ ($j=0$ to $M-1$) from said recording medium in the forward direction, reproducing, after reproducing said re-arrayed block $BL_{M/2}$, every two re-arrayed blocks $BL_j$ ($j=0$ to $M-1$) in the reverse direction;

writing the reproduced re-arrayed blocks $BL_j$ ($j=0$ to $M-1$) in $\underline{N}$ of said memories so that data $d_{ij}$ ($i=0$ to $N-1$, $j=0$ to $M-1$) of the small-blocks constituting the large-block data $D_i$ ($i=0$ to $N-1$) will be stored in the same memory; and reading and sending out the small-block data $d_{ij}$ ($i=0$ to $N-1$, $j=0$ to $M-1$) from said $\underline{N}$ memories.

3. The method as claimed in claim 2, wherein the speed of reading out the re-arrayed block $BL_i$ ($j=0$ to $M-1$) from said recording medium and writing the blocks in said memories is faster than the rate of reading out the re-arrayed blocks $BL_j$ ($j=0$ to $M-1$) from said memories and wherein the time for reading out said small block data $d_{ij}$ ($i=0$ to $N-1$, $j=0$ to $M-1$) from said $\underline{N}$ memories is not less than the time required for reading out one of the small-block data $d_{ij}$ ($i=0$ to $N-1$, $j=0$ to $M-1$) constituting said re-arrayed blocks $BL_i$ ($j=0$ to $M-1$) from said recording medium and for writing the read-out small-block data in said memories summed to the time required for reproducing every two re-arrayed blocks $BL_i$ ($j=0$ to $M-1$) from the recording medium or the time required for the head to be moved from one re-arrayed block to the second next re-arranged block.

\* \* \* \* \*